Figure 1:
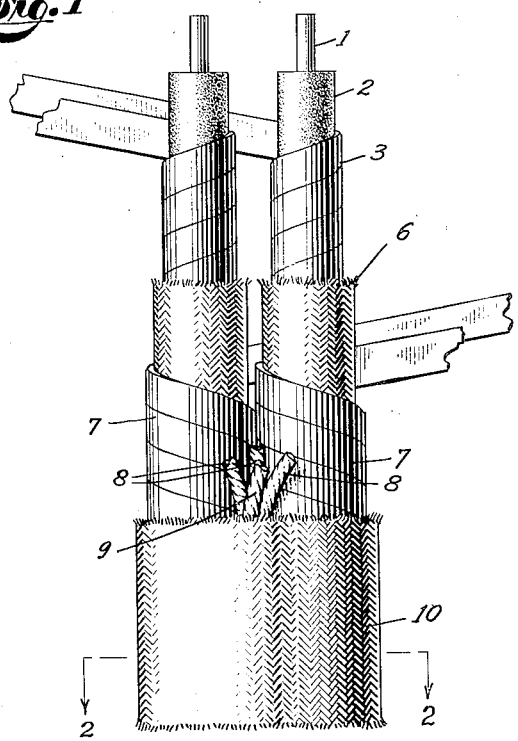

Dec. 23, 1924.

C. W. ABBOTT

ELECTRICAL CONDUCTOR

Filed March 16, 1923

1,520,680

INVENTOR
Charles W. Abbott
BY
ATTORNEYS

Patented Dec. 23, 1924.

1,520,680

UNITED STATES PATENT OFFICE.

CHARLES W. ABBOTT, OF HARTFORD, CONNECTICUT, ASSIGNOR TO ROME WIRE COMPANY, OF ROME, NEW YORK, A CORPORATION OF NEW YORK.

ELECTRICAL CONDUCTOR.

Application filed March 16, 1923. Serial No. 625,434.

*To all whom it may concern:*

Be it known that I, CHARLES W. ABBOTT, a citizen of the United States, residing in Hartford, county of Hartford, and State of Connecticut, have invented an Improvement in Electrical Conductors, of which the following is a specification.

The present invention relates to improvements in insulated electrical conductors or cables which are particularly adapted for use in wiring buildings to supply current therein for lighting and other purposes. The object of the invention is to provide electrical conductors or cables which will be satisfactorily insulated, suitably constructed to withstand the effects of overloading the electrical circuits, which cannot be easily damaged by fire, water, abrasion, or impact and which in other respects will be eminently satisfactory when used for any appropriate purpose. Further objects of the invention will be in part obvious and in part specifically pointed out in the following description of a preferred and illustrative embodiment thereof.

It is of prime importance that wire or cable, particularly that which is to be used in the wiring of buildings, shall be well insulated electrically and inasmuch as the best electrical insulation is obtained by the use of rubber compounds containing a relatively high percentage of rubber, it is equally essential that the insulated wires or cables thus formed be protected against mechanical injury which would tend to break down the insulation and permit short circuits or grounds to occur. It is desirable that such mechanical protection should also increase the electrical protection afforded by the usual rubber insulation and should be of such a character that it will not be injuriously affected by the tensile and torsional strains to which the conductors are often subjected during installation, by bending and by accidental blows or pressure. The conditions under which such wires or cables are installed also necessitate the use of a protective covering which will remain substantially unaffected by atmospheric changes and will not deteriorate when subjected to moisture or water over relatively long periods of time and which cannot be readily destroyed by rodents. Inasmuch as the principal danger resulting from short circuits or grounds is that of causing fire, it is of great importance that the protective covering of the insulated wires be highly resistant to fire whether the same originates inside the conductors, as by an overload, or outside the conductors, in fact the entire mode of constructing the conductor or cable is directed to minimizing the fire risk.

There have been proposed and are in use several clearly distinguishable types or systems of building wiring. These types have various advantages and disadvantages and the present invention provides a construction which obviates several of the well recognized disadvantages of presently used constructions while retaining the principal advantageous qualities thereof. At the same time the structure of the present invention is relatively inexpensive and may be produced economically and expeditiously in large quantities and may be installed with a minimum of labor.

The system of wiring buildings which is generally accepted as the highest standard type and which is the most expensive involves the installation of pipe conduits and the drawing of insulated wires therethrough. This system provides admirable mechanical protection but nevertheless leaves a substantial air space around the insulated wires which may be sufficient to support combustion and the generation of deleterious gases should the wires become overloaded and the relatively inflammable insulation ignited. This type of installation does not add to the electrical protection of the conductors.

Another system of wiring includes the use of a flexible armored cable which consists of two or more conductors suitably insulated from each other and contained within a helically wound metallic armor. This material affords a substantial mechanical protection for the electrical conductors but like the first mentioned system it does not increase the electrical protection over that ordinarily applied to the wires covered by the metallic conduit. Furthermore, it is readily affected by water.

In the two types of installations just described the effectiveness of the electrical protection depends to a large extent upon the grounding of the metallic sheath. Oftentimes this grounding is not effectively accomplished and when it is ineffective and a short circuit occurs, a very dangerous condition results.

In some instances the ordinary insulated wire, that is, a copper conductor covered with a rubber compound and a braid without other protection, is used in wiring buildings and wherever this wire is apt to come in contact with beams or the like, it is protected by porcelain knobs or tubes or by a flexible sheath which is drawn loosely over the wire. Installations of this character are comparatively unsafe wherever the insulated conductor is exposed and the protection afforded by the flexible covering through which it may be drawn and which usually consists of a hollow tube of helically wound material having an outside braid impregnated with a compound of asphaltum base, is comparatively unsafe and certainly much less satisfactory than the systems previously mentioned.

The conductors or cables constructed and protected in accordance with the present invention provide a homogeneous compact structure of materials which all have insulating properties and of a construction in which there are no appreciable air spaces, which is well protected against abrasion, moisture and the attacks of rodents, which is relatively flexible and which will, because of the several compounds with which it is impregnated, resist the action of any fire that may originate inside or outside the conductors and which is a relatively poor conductor of heat.

Inasmuch as the present invention may find its most general application to electric conductors and cables used in the wiring of buildings, and inasmuch as by far the largest quantity of material used for this purpose is in the form of a two conductor cable, the preferred embodiment of the invention selected for purposes of illustration is such a two conductor cable particularly adapted for the wiring of buildings. Obviously the invention is applicable to single conductors or cables containing more than two conductors.

Figure 2:
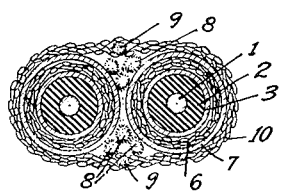
Figure 3:
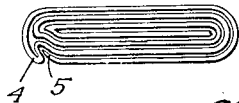

The accompanying drawings show a preferred and illustrative form of the invention and therein, Figure 1 is a plan view of a short section of cable having the several sheaths of material progressively removed to show the interior construction, Figure 2 is a cross-section on the line 2—2 of Figure 1, and Figure 3 is a greatly enlarged cross-section of a preferred form of laminated paper tape which may be used.

Upon reference to the drawings it will be seen that the complete structure is built up upon metallic conductors 1 which are covered with an insulating compound 2. This compound preferably has a high percentage of rubber so that the conductors will be adequately protected electrically and it may be applied to the wires and cured by any one of the methods now widely used.

The first step in the production of the cables shown in the drawings consists in winding helically upon the insulated wire a strip of protective material 3. This protective material preferably takes the form of a strip of an insulating fibrous material such as paper which, if desired, may be of laminated construction such as shown in Figure 3.

The particular form of tape shown consists of a strip of relatively thin kraft paper repeatedly folded upon itself from one edge until a tape of the required thickness has been built up. This folding may be accomplished by suitable dies or rollers of such a character that a compact tape structure is secured. In the present instance the strip of paper is folded six times and upon the next to the last fold an excess of material 4 is left so that it may, during the final forming operation, be doubled back upon itself to overlie the outer edge 5 of the original strip. Inasmuch as this particular form of tape by itself forms no part of the present invention but is the invention of another and may be the subject-matter of a separate application for patent, it will not be further described herein.

The tape so formed or any other suitable strip of protective material may be carried upon suitable reels or spools and placed in a suitable winding machine which will carry the reels or spools around the insulated wire as it is drawn along the axis of rotation thereof so that the tape will be tightly wound onto the wire in the form of a closed helix. In this manner a very substantial mechanical as well as electrical protection is afforded for the rubber compound 2.

Preferably a cotton braid 6 is now applied over the paper wrapping 3. This may conveniently be done by leading the wrapped conductor to a braiding machine. The braid is preferably rather open but nevertheless tightly braided upon the paper wrapping to hold it securely in place.

Inasmuch as the paper tape and cotton braid are naturally inflammable they are treated or impregnated to render them fire resisting and at the same time reasonably moisture proof. This treatment is preferably carried out after the two materials have been placed upon the conductor.

I prefer to use a fire resisting and moisture proofing compound containing as its principal ingredients zinc oxide and silicate of soda. In such a compound the fire resisting properties are proportionately greater than the moisture proofing properties. This compound may be applied in any suitable manner as by leading the braided conductor to an open tank containing the compound in such condition as to viscosity and temperature as is suitable. The compound will penetrate through the open braid 6 and impregnate to a substantial extent the paper wrapping 3, filling the interstices thereof. The compound preferably used is such that it will dry quite rapidly so that the conductor may be reeled or taken directly to the next step in the production of the cable.

In order to distinguish the polarity of individual conductors which are later made up into a cable, suitable coloring matter may be added to the compound and the cable may be made up of individual conductors thus differently colored and distinguished.

For further mechanical and electrical protection the conductors may be again wrapped individually; the second wrapping preferably consisting of a paper tape 7 similar to, if not identical in construction with, the protective covering 3. The winding of the second wrap is preferably accomplished in a reverse direction so as to break joints with the first winding of protective material.

The individual conductors to which the second protective wrapping has been applied may be further treated individually or assembled and then treated just prior to the application of the final braid with a second fire and moisture resisting compound of a slightly different character than the compound first used and in which the moisture resisting properties are greater than the fire resisting properties. For this purpose I preferably use a compound containing as its principal or distinguishing ingredients barium sulphate and china wood oil thinned with coal tar naphtha. Substantially any desirable or appropriate solvent may be used in this compound because the compound or the solvent used cannot penetrate through the previously applied compound and have any deleterious effect upon the rubber insulation. Such a compound has proved to be highly effective in this construction probably due to the tendency of the wrapping 7 to absorb the oil of the compound, thus rendering the wrapping highly moisture proof and to deposit the inert sulphate on the outside of the wrapping and in the interstices thereof, thus providing a layer of fire resisting material.

Inasmuch as the finished cable will, during installation, be frequently pulled under floors or between partitions, it is desirable that it have a high degree of tensile strength and although the cable, because of its construction in other respects, will be very strong under tensile strain, there is preferably incorporated therein a further element for the purpose of further increasing the tensile strength. When the individual conductors are assembled cords 8 of jute or other appropriate material are laid in the valleys between the individual conductors and, if desired, a cord 9 may be interwoven with the final braid 10. The final braid 10 is preferably applied more closely than the braids 6 and may, if desired, be of a coarser and stronger thread. As soon as this braid has been applied the cable is conducted to a tank containing another moisture and fire resisting compound, such for example as the compound applied to the braids 6 only in this instance the excess of compound is wiped off. Due to the fact that the braid 10 is closer than the braid 3, the compound will not penetrate as readily but will nevertheless thoroughly saturate the outer braid and adequately protect it from the effects of moisture or fire.

If desired, the cable completed as above described may be subjected to a further treatment to still further improve the moisture resisting properties, to render the cable easier to handle and easier to draw or fish under floors or in partitions. Such treatment may consist in applying to the cable a very thin coating of sterine having a high melting point and this coating may be applied by drawing the completed cable through a tank of heated liquid sterine at relatively high speed and wiping off the excess material.

The embodiment of the invention just described provides a homogeneous compact structure which is relatively inexpensive to manufacture and yet possesses qualtities far superior to those of even more expensive materials now in common use. The construction shown adds mechanical protection to the ordinary rubber insulated wire and at the same time increases the electrical protection thereof, the whole being treated with appropriate compounds to render the structure fire resisting and moisture proof.

Although only one embodiment of the invention has been shown and described herein, it will be understood that the invention may be variously modified and embodied within the scope of the subjoined claims.

I claim as my invention:

1. An article of manufacture comprising, in combination, metallic electrical conductors, a surrounding sheath of rubber insulating compound for each of said conductors, a protective covering in strip form closely wound about each of said insulated conductors, a fabric jacket surrounding each of said protective coverings, a second protective covering in strip form closely wound about each of said fabric jackets, a fabric jacket surrounding the whole, and means to render the coverings and jackets substantially fire and moisture proof.

2. An article of manufacture comprising, in combination, a metallic electrical conductor, a surrounding sheath of insulating rubber compound, a protective covering in strip form closely wound about said insulated conductor, a fabric jacket surrounding said protective covering, a second protective covering in strip form closely wound about said fabric jacket, an outer covering surrounding the whole, and means to render the whole substantially fire and moisture proof.

3. An article of manufacture comprising, in combination, metallic electrical conductors, a surrounding sheath of rubber insulating compound for each of said conductors, a protective covering in strip form closely wound about each of said insulated conductors, a fabric jacket surrounding each of said protective coverings, a second protective covering in strip form closely wound about each of said fabric jackets, and a fabric jacket surrounding the whole, one of said protective coverings and the adjacent jacket being treated with a fire resisting and moisture proofing compound.

4. An article of manufacture comprising, in combination, metallic electrical conductors, a surrounding sheath of rubber insulating compound for each of said conductors, a protective covering in strip form closely wound about each of said insulated conductors, a fabric jacket surrounding each of said protective coverings, a second protective covering in strip form closely wound about each of said fabric jackets, a fabric jacket surrounding the whole and a fire resisting compound applied to the outer jacket.

5. An article of manufacture comprising, in combination, metallic electrical conductors, a surrounding sheath of rubber insulating compound for each of said conductors, a protective covering in strip form closely wound about each of said insulated conductors, a fabric jacket surrounding each of said protective coverings, a second protective covering in strip form closely wound about each of said fabric jackets, a fabric jacket surrounding the whole and fire resisting and moisture proofing compounds applied to each of said jackets.

6. An article of manufacture comprising, in combination, metallic electrical conductors, a surrounding sheath of rubber insulating compound for each of said conductors, a protective covering in strip form closely wound about each of said insulated conductors, a fabric jacket surrounding each of said protective coverings, a second protective covering in strip form closely wound about each of said fabric jackets, a fabric jacket surrounding the whole, a compound primarily fire resisting applied to said first mentioned jackets, a compound primarily moisture repellent applied to said second protective coverings and a fire and moisture resisting compound applied to the outer jacket.

7. An article of manufacture comprising, in combination, a metallic electrical conductor, and an insulating and protecting covering therefor including a laminated paper strip helically wound about said conductor, means binding said strip in place, a second laminated paper strip helically wound to surround the first strip, an outer covering, and means to render the whole substantially fire and moisture proof.

8. An article of manufacture comprising in combination, a metallic electrical conductor, a surrounding sheath of insulating compound, a wrapped protective covering in strip form, means to retain said protective covering in place, a second wrapped protective covering in strip form, an outer jacket surrounding the whole, and means to render the whole substantially fire and moisture proof.

9. An article of manufacture comprising, in combination, a metallic electrical conductor, a surrounding sheath of insulating compound, a wrapped strip of fibrous material surrounding said insulated conductor, means to retain said protective covering in place, a second wrapped protective covering in strip form, an outer jacket surrounding the whole; and means to render the whole substantially fire and moisture proof.

10. An article of manufacture comprising, in combination, a metallic electrical conductor, a surrounding sheath of insulating compound, two wrapped protective coverings surrounding said insulated conductor, a fabric jacket intermediate said protective coverings, an outer jacket surrounding the whole; and means to render the whole substantially fire and moisture proof.

11. An article of manufacture comprising in combination, electrical conductors each surrounded by a sheath of plastic insulating compound, a strip of relatively unyielding laminated paper helically wound upon the sheath of each conductor, a braided jacket over each of said wound strips, a compound primarily fire resisting applied to said braided jackets and strips, a second strip of relatively unyielding laminated paper helically wound over the braided jacket of each conductor, a compound primarily moisture resisting applied thereto, a braided covering surrounding and uniting said conductors and a compound primarily fire resisting applied to said outer braided covering.

12. An article of manufacture comprising, in combination, a metallic electrical conductor, a surrounding sheath of insulating compound, a protective strip of laminated fibrous material surrounding said insulated conductor, a binding overlying said strip, a second protective strip overlying said binding, an outer jacket surrounding the whole, and means to render the whole substantially fire and moisture proof.

13. An article of manufacture comprising, in combination, a metallic electrical conductor, a surrounding sheath of insulating rubber compound, a protective covering of fibrous material in strip form closely wound about said insulating compound and a fire resisting and moisture proofing compound containing china wood oil and barium sulphate applied to the fibrous material whereby the china wood oil is partially absorbed by said fibrous material, the barium sulphate being deposited upon the surface thereof.

14. An article of manufacture comprising, in combination, electrical conductors each surrounded by a sheath of plastic insulating compound, a strip of relatively unyielding laminated paper helically wound upon the sheath of each conductor, a braided jacket over each of said wound strips, a compound containing zinc oxide and silicate of soda applied to said braided jackets and strips, a second strip of relatively unyielding laminated paper helically wound over the braided jacket of each conductor, a compound primarily moisture resisting applied thereto, a braided covering surrounding and uniting said conductors and a compound primarily fire resisting applied to said outer braided covering.

15. An article of manufacture comprising, in combination, electrical conductors each surrounded by a sheath of plastic insulating compound, a strip of relatively unyielding laminated paper helically wound upon the sheath of each conductor, a braided jacket over each of said wound strips, a compound primarily fire resisting applied to said braided jackets and strips, a second strip of relatively unyielding laminated paper helically wound over the braided jacket of each conductor, a relatively incombustible compound applied thereto, a braided covering surrounding and uniting said conductors and a compound primarily fire resisting applied to said outer braided covering.

16. An article of manufacture comprising, in combination, electrical conductors each surrounded by a sheath of plastic insulating compound, a strip of relatively unyielding laminated paper helically wound upon the sheath of each conductor, a braided jacket over each of said wound strips, a compound primarily fire resisting applied to said braided jackets and strips, a second strip of relatively unyielding laminated paper helically wound over the braided jacket of each conductor, a compound primarily moisture resisting applied thereto, a braided covering surrounding and uniting said conductors and a compound containing zinc oxide and silicate of soda applied to said outer braided covering.

17. An article of manufacture comprising, in combination, electrical conductors each surrounded by a sheath of plastic insulating compound, a strip of relatively unyielding laminated paper helically wound upon the sheath of each conductor, a braided jacket over each of said wound strips, a compound containing zinc oxide and silicate of soda applied to said braided jackets and strips, a second strip of relatively unyielding laminated paper helically wound over the braided jacket of each conductor, a relatively incombustible compound applied thereto, a braided covering surrounding and uniting said conductors and a compound containing zinc oxide and silicate of soda applied to said outer braided covering.

18. An article of manufacture comprising in combination, a metallic conductor; an insulation therefor comprising rubber, braid and paper tape surrounding and enclosing said conductor; a binding and protection for the conductor and said insulation comprising a paper tape wound thereabout and a braided jacket enclosing the tape and securing it in position; and fire and moisture proofing material incorporated therein.

19. An article of manufacture comprising in combination a plurality of metallic conductors; an insulation for each conductor comprising rubber, braid and paper tape; a binding and protection for the conductors comprising paper tape and a braided fabric jacket; the braided jacket serving also to bind together the conductors; and fire and moisture proofing material incorporated therein.

20. An article of manufacture comprising in combination a metallic conductor; a rubber sheath encasing said conductor; a protection for said rubber sheath comprising co-operating braid and paper tape; a further protecting casing comprising a paper tape and a fabric jacket; and fire and moisture proofing material incorporated therein.

In testimony whereof, I have signed my name to this specification this 13th day of March, 1923.

CHARLES W. ABBOTT.